(12) United States Patent
Yamamoto et al.

(10) Patent No.: US 11,367,988 B2
(45) Date of Patent: Jun. 21, 2022

(54) GAS LASER DEVICE

(71) Applicant: Mitsubishi Electric Corporation, Tokyo (JP)

(72) Inventors: Tatsuya Yamamoto, Tokyo (JP); Junichi Nishimae, Tokyo (JP); Yuzuru Tadokoro, Tokyo (JP); Masashi Naruse, Tokyo (JP); Takuya Kawashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/439,815

(22) PCT Filed: May 17, 2019

(86) PCT No.: PCT/JP2019/019786
§ 371 (c)(1),
(2) Date: Sep. 16, 2021

(87) PCT Pub. No.: WO2020/234944
PCT Pub. Date: Nov. 26, 2020

(65) Prior Publication Data
US 2022/0094129 A1     Mar. 24, 2022

(51) Int. Cl.
*H01S 3/034* (2006.01)
*H01S 3/13* (2006.01)

(52) U.S. Cl.
CPC ............... *H01S 3/034* (2013.01); *H01S 3/13* (2013.01)

(58) Field of Classification Search
CPC ............. H01S 3/034; H01S 3/13; H01S 3/139
See application file for complete search history.

(56) References Cited

U.S. PATENT DOCUMENTS 3,732,013 A    5/1973   Hieslmair et al.
5,357,539 A   10/1994   Otani et al.
(Continued)

FOREIGN PATENT DOCUMENTS

JP    2-162783 A    6/1990
JP    5-95142 A     4/1993
(Continued)

OTHER PUBLICATIONS

International Search Report and Written Opinion daed Jul. 30, 2019, received for PCT Application PCT/JP2019/019786, Filed on May 17, 2019, 10 pages including English Translation.
(Continued)

*Primary Examiner* — Xinning (Tom) Niu
(74) *Attorney, Agent, or Firm* — Xsensus LLP

(57) ABSTRACT

A gas laser device includes a shielding plate that is a first shielding member, and a shielding plate that is a second shielding member. The first shielding member includes a first opening, and a second opening. A laser beam that is to be propagated to discharge regions passes through the first opening. The laser beam that has taken a round trip through the discharge regions after passing through the first opening passes through the second opening. The second shielding plate faces the first shielding member the discharge regions located therebetween. The shielding plate includes an opening that is a third opening. The laser beam that has been propagated through the first opening and the discharge regions, and the laser beam that is to be propagated to the second opening through the discharge regions pass through the third opening. A plane shape of the third opening includes a rectilinear segment.

7 Claims, 14 Drawing Sheets

(56) References Cited

U.S. PATENT DOCUMENTS

| | | | |
|---|---|---|---|
| 9,680,277 B2 | 6/2017 | Nowak et al. | |
| 9,762,024 B2 | 9/2017 | Kurosawa et al. | |
| 2015/0188277 A1* | 7/2015 | Nowak | H01S 3/076 359/342 |
| 2016/0134075 A1* | 5/2016 | Tanino | H01S 3/034 372/38.05 |

FOREIGN PATENT DOCUMENTS

| | | |
|---|---|---|
| JP | 11-112074 A | 4/1999 |
| JP | 2008-42048 A | 2/2008 |
| JP | 2011-159932 A | 8/2011 |
| JP | 2015-103762 A | 6/2015 |
| JP | 6215334 B2 | 10/2017 |
| WO | 2012/176252 A1 | 12/2012 |
| WO | 2014/045889 A1 | 3/2014 |
| WO | 2015/008405 A1 | 1/2015 |

OTHER PUBLICATIONS

Notice of Reasons for Refusal dated Dec. 17, 2019, received for JP Application 2019-557511, 6 pages including English Translation.
Decision to Grant dated Apr. 7, 2020, received for JP Application 2019-557511, 5 pages including English Translation.

* cited by examiner

GAS LASER DEVICE

Cross-Reference to Related Application

The present application is based on PCT filing PCT/JP2019/019786, filed May 17, 2019, the entire contents of which are incorporated herein by reference.

FIELD

The present invention relates to a gas laser device for amplifying a laser beam with a laser gas.

BACKGROUND

In a gas laser amplification system including a gas laser device, self-oscillating light may result from amplification of spontaneous emission light generated in the gas laser device. The self-oscillating light consumes amplification gain of the gas laser device, thus decreasing an amplification factor for a pulse laser beam that is output from the gas laser amplification system. Due to the self-oscillating light, therefore, the pulse laser beam from the gas laser amplification system is reduced in output power. Components of the gas laser amplification system can be irradiated with the self-oscillating light and damaged by the heat. Controlled oscillation of the self-oscillating light is, therefore, desirable in the gas laser device.

A gas laser apparatus disclosed in Patent Literature 1 includes a reflector that reflects self-oscillating light and an optical absorber that absorbs the self-oscillating light reflected by the reflector. In the gas laser apparatus according to Patent Literature 1, the self-oscillating light propagated in a direction different from an optical axis of a pulse laser beam is reflected by the reflector toward the optical absorber. The optical absorber of the gas laser apparatus according to Patent Literature 1 absorbs the self-oscillating light to thereby remove the self-oscillating light.

CITATION LIST

Patent Literature

Patent Literature 1: Japanese Patent No. 6215334

SUMMARY

Technical Problem

While the above-described conventional gas laser apparatus according to Patent Literature 1 is capable of removing the self-oscillating light propagated in the direction different from the optical axis of the pulse laser beam, this gas laser apparatus unfortunately fails to remove self-oscillating light that oscillates along the same optical axis as that of the pulse laser beam.

The present invention has been made in view of the above, and an object of the present invention is to obtain a gas laser device that is capable of controlling oscillation of self-oscillating light that stems from spontaneous emission light.

Solution to Problem

In order to solve the above-mentioned problem and achieve the object, a gas laser device according to the present invention comprising: a discharge electrode to excite a laser gas supplied to a discharge region; a first shielding member including a first opening to allow a first laser beam to pass therethrough, the first laser beam being a laser beam that is to be propagated to the discharge region, and a second opening to allow a second laser beam to pass therethrough, the second laser beam being the laser beam that has taken a round trip through the discharge region after passing through the first opening; and a second shielding member facing the first shielding member with the discharge region located therebetween, the second shielding member including a third opening through which the first laser beam that has been propagated through the first opening and the discharge region and the second laser beam that is to be propagated to the second opening through the discharge region pass. A plane shape of the third opening includes a rectilinear segment. When a plane shape of the third opening is projected onto the first shielding member, a line segment interconnecting a centroid of a plane shape of the second opening and a centroid of a plane shape of the third opening is directed differently from a line perpendicular to the rectilinear segment.

Advantageous Effect of Invention

The gas laser device according to the present invention is capable of controlling the oscillation of the self-oscillating light that stems from the spontaneous emission light.

DESCRIPTION OF EMBODIMENTS

With reference to the drawings, a detailed description is hereinafter provided of gas laser devices according to embodiments of the present invention. It is to be noted that these embodiments are not restrictive of the present invention.

First Embodiment

Figure 1:
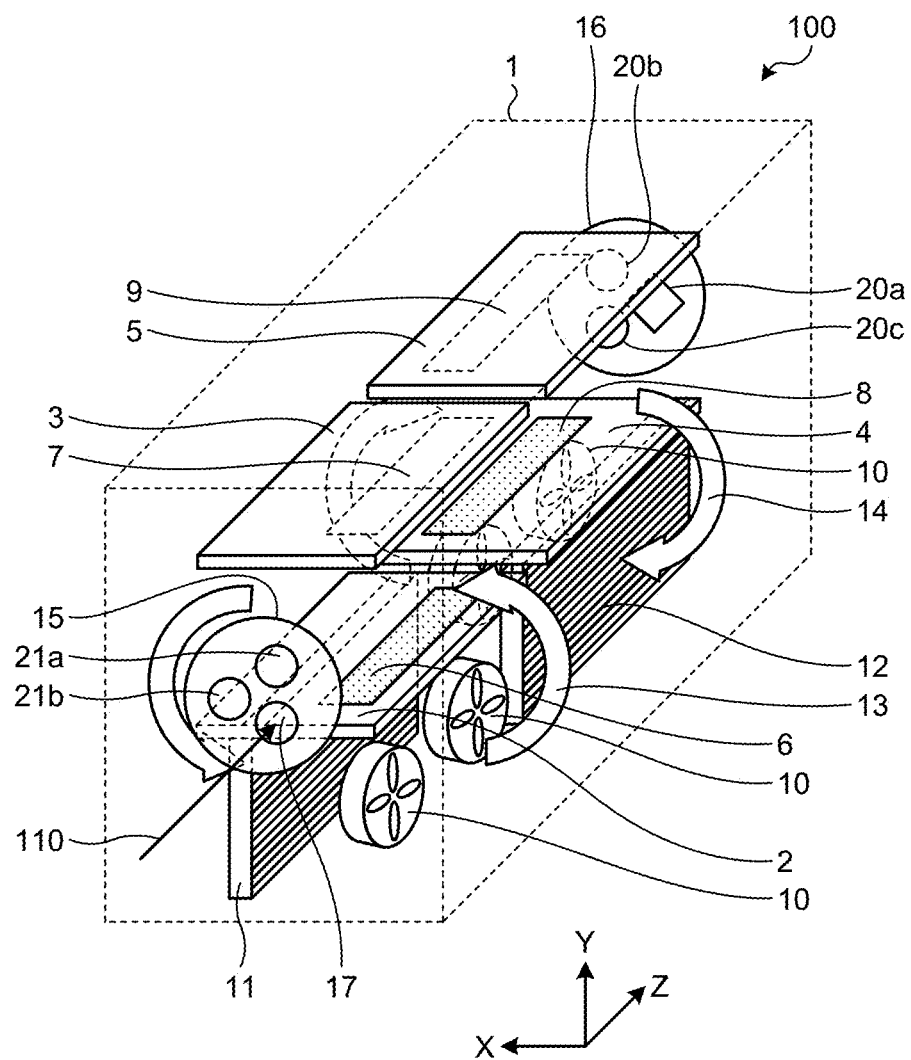
FIG. 1 is a perspective view of a gas laser device according to a first embodiment of the present invention.
Figure 2:
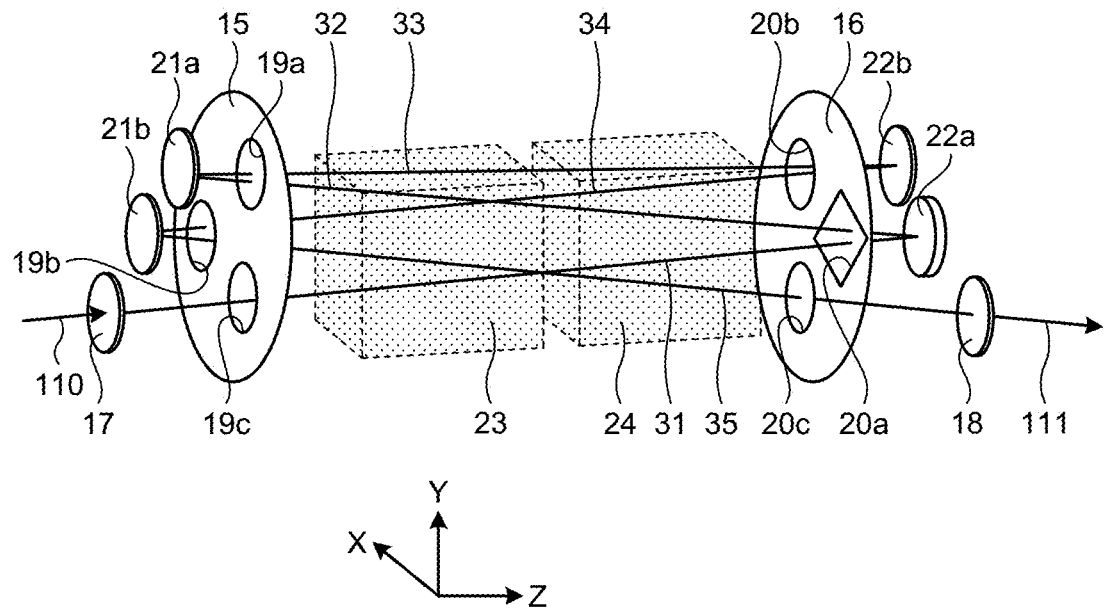
FIG. 2 is a perspective view of a part of an internal configuration of the gas laser device according to the first embodiment.
Figure 3:
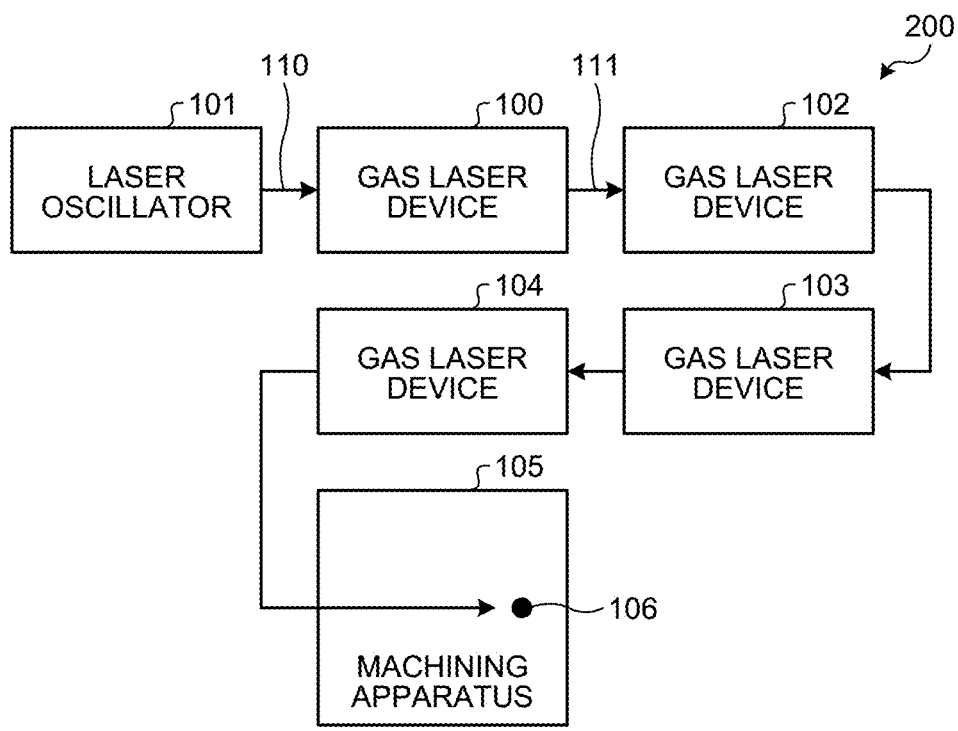
FIG. 3 is a block diagram of a gas laser amplification system including the gas laser device according to the first embodiment.

FIG. 1 is a perspective view of a gas laser device according to the first embodiment of the present invention. FIG. 2 is a perspective view of a part of an internal configuration of the gas laser device according to the first embodiment. FIG. 3 is a block diagram of a gas laser amplification system including the gas laser device according to the first embodiment.

The gas laser device 100 according to the first embodiment is what is called a three-axis orthogonal gas laser device. In FIGS. 1 and 2, an X-direction, a Y-direction, and a Z-direction are three directions orthogonal to one another. The Y-directions indicate directions along an interelectrode gap length, and the X-directions indicate directions of flows of laser gas within interelectrode gaps. In the gas laser device 100, optical axes are directed roughly along the Z-directions. In FIGS. 1 and 2, one of the X-directions is a positive X-direction indicated by an arrow, and the other of the X-directions is a negative X-direction opposite to the direction indicated by the arrow. One of the Y-directions is a positive Y-direction indicated by an arrow, and the other of the Y-directions is a negative Y-direction opposite to the direction indicated by the arrow. One of the Z-directions is a positive Z-direction indicated by an arrow, and the other of the Z-directions is a negative Z-direction opposite to the direction indicated by the arrow.

The gas laser device 100 includes a housing 1, four electrode substrates 2, 3, 4, and 5, and electrodes 6, 7, 8, and 9. The housing seals up a laser gas serving as a laser medium. The electrode substrates 2, 3, 4, and 5 are housed in the housing 1. The electrodes 6, 7, 8, and 9 serve as discharge electrodes. The electrode 6 is provided on the electrode substrate 2. The electrode 7 is provided on the electrode substrate 3. The electrodes 6 and 7, which define a discharge electrode pair, face each other with a discharge region 23 formed therebetween. The electrodes 6 and 7 excite the laser gas supplied to the discharge region 23. The electrode 8 is provided on the electrode substrate 4. The electrode 9 is provided on the electrode substrate 5. The electrodes 8 and 9, which define are a discharge electrode pair, face each other with a discharge region 24 formed therebetween. The electrodes 8 and 9 excite the laser gas supplied to the discharge region 24.

The electrode substrates 2, 3, 4, and 5 are made using a dielectric such as alumina. The electrodes 6, 7, 8, and 9, which are made of metal, are formed on a surfaces of a corresponding one of the electrode substrates 2, 3, 4, and 5 through metallization, pasting, or any other technique. The surfaces of the electrodes 6, 7, 8, and 9 are covered with dielectrics such as alumina as in the electrode substrates 2, 3, 4, and 5. In FIG. 1, the dielectric covering the surfaces of the electrodes 6, 7, 8, and 9 is not illustrated.

When alternating-current voltage from a high-frequency power supply is applied between the electrodes 6 and 7 and between the electrodes 8 and 9, silent discharges occur. As a result, the discharge region 23 is formed between the electrodes 6 and 7. The discharge region 24 is formed between the electrodes 8 and 9. The silent discharge is also referred to as ozonizer discharge or dielectric barrier discharge.

The housing 1 houses blowers 10 and heat exchangers 11 and 12. The blowers 10 circulate the laser gas sealed up in the housing 1. The heat exchanger 11 is disposed on an opposite side of the electrode substrate 2 from the discharge region 23. The blowers 10, which are disposed facing the heat exchanger 11, produce a gas flow 13 that circulates between the heat exchanger 11 and the discharge region 23. The direction of gas flow 13 is a positive X-direction in the discharge region 23. The blowers 10 supply the gas flow 13 of about 100 m/s to the discharge region 23. After passing through the discharge region 23, the gas flow 13 is cooled by the heat exchanger 11. After being cooled by the heat exchanger 11, the gas flow 13 is supplied to the discharge region 23 again.

The heat exchanger 12 is disposed on an opposite side of the electrode substrate 4 from the discharge region 24. The blowers 10, which are disposed facing the heat exchanger 12, produce a gas flow 14 that circulates between the heat exchanger 12 and the discharge region 24. The direction of gas flow 14 is a negative X-direction in the discharge region 24. The blowers 10 supply the gas flow 14 of about 100 m/s to the discharge region 24. After passing through the discharge region 24, the gas flow 14 is cooled by the heat exchanger 12. After being cooled by the heat exchanger 12, the gas flow 14 is supplied to the discharge region 24 again. The laser gas in the discharge regions 23 and 24 is maintained at a pressure lower than atmospheric pressure.

The direction of gas flow 13 in the discharge region 23 and the direction of the gas flow 14 in the discharge region 24 are opposite to each other. An overall gain distribution obtained by superimposing gain distributions in the respective discharge regions 23 and 24 of the gas laser device 100 is symmetrical. This enables a laser beam to have improved symmetry when output from the gas laser device 100.

The laser gas includes, for example, carbon dioxide gas and nitrogen gas. When a laser beam passes through the laser gas with molecules or atoms in the laser gas excited to an upper laser level by the silent discharges, stimulated emission occurs producing an amplified beam having, for example, a wavelength around 10.6 μm. The laser gas to use in the gas laser device 100 may be CO, He—Cd, HF, Ar+, ArF, KrF, XeCl, XeF, or any other medium.

The gas laser device 100 includes mirrors 21a, 21b, 22a, and 22b, shielding plates 15 and 16, and windows 17. The mirrors 21a, 21b, 22a, and 22b reflect laser beams propagated through the discharge regions 23 and 24. The shielding plates 15 and 16 block off the laser beams. The windows 17 and 18 allow the laser beams to be transmit therethough.

The mirrors 21a and 21b, which are first mirrors, face the mirrors 22a and 22b, which are second mirrors, with the shielding plate 15, the discharge regions 23 and 24, and the shielding plate 16 disposed between the mirrors 21a,21b and the mirrors 22a,22b. The mirrors 21a, 21b, 22a, and 22b form an optical amplification path. The mirrors 21a and 21b are attached to the housing 1 via a mirror holder. The mirrors 22a and 22b are attached to the housing 1 via a mirror holder. In FIGS. 1 and 2, the mirror holders are not illustrated. Total reflection mirrors are used as the mirrors 21a, 21b, 22a, and 22b. A reflection surface of each of the mirrors 21a, 21b, 22a, and 22b may be flat, concave, or convex. In other words, each of the mirrors 21a, 21b, 22a, and 22b may be a plane mirror, a concave mirror, or a convex mirror.

The window 17 is provided on the same side of the housing 1 as the mirrors 21a and 21b are provided. A laser beam propagated along an optical axis 110 from outside the housing 1 enters and is transmitted through the window 17, thus entering the housing 1. The window 18 is provided on the same side of the housing 1 as the mirrors 22a and 22b are provided. The laser beam enters the window 18 from inside the housing 1 and is transmitted through the window 18. After being transmitted through the window 18, the laser beam exits the housing 1, and is propagated along an optical axis 111. The windows 17 and 18 function to allow transmission of the laser beams therethrough and also function to insulate an internal space of the housing 1 from the outside of the housing 1. Examples to use as the windows 17 and 18 are diamond substrates that each include an antireflection coating.

The shielding plate 15, which is a first shielding member, is disposed between the window 17, the mirrors 21a, 21b and the discharge region 23. The shielding plate 15 includes openings 19a and 19b. Laser beams directed from the discharge region 23 toward the mirrors 21a and 21b pass through the openings 19a and 19b. Laser beams reflected by the mirrors 21a and 21b also pass through the openings 19a and 19b. The shielding plate 15 also includes an opening 19c. Laser beams transmitted through the window 17 pass through the opening 19c. The openings 19a, 19b, and 19c are arranged in the X and Y directions. Plane shapes of the openings 19a, 19b, and 19c are all circular. The openings 19a, 19b, and 19c are all circular openings. The shielding plate 15 blocks off laser beams at its area other than the openings 19a, 19b, and 19c.

The shielding plate 16, which is a second shielding member, is disposed between the window 18, the mirrors 22a, 22b and the discharge region 24. The shielding plates 15 and 16 face each other with the discharge regions 23 and 24 located therebetween. The shielding plate 16 includes openings 20a and 20b. Laser beams propagated from the discharge region 24 to the mirrors 22a and 22b pass through the openings 20a and 20b. Laser beams reflected by the mirrors 22a and 22b pass through the openings 20a and 20b. The shielding plate 16 also includes an opening 20c. Laser beams propagated from the discharge region 24 to the window 18 pass through the opening 20c. The openings 20a, 20b, and 20c are arranged in the X and Y directions. The opening 20a has a rectangular plane shape. The openings 20b and 20c have circular plane shapes. Among the openings 20a, 20b, and 20c, the opening 20a is a non-circular opening, and the openings 20b and 20c are circular openings. The shielding plate 16 blocks off laser beams at its area other than the openings 20a, 20b, and 20c.

The gas laser amplification system 200 illustrated in FIG. 3 includes a laser oscillator 101, four gas laser devices 100, 102, 103, and 104, and a machining apparatus 105. The laser oscillator 101 produces a laser beam. The gas laser devices 100, 102, 103, and 104 amplify the laser beam. The machining apparatus 105 is supplied with the amplified laser beam.

The laser oscillator 101 is a quantum cascade laser. The laser oscillator 101 may be a master oscillator power amplifier (MOPA) in which a gas laser amplifier is coupled to a small-sized gas laser oscillator that serves as a master oscillator.

A laser beam emitted from the laser oscillator 101 is propagated along the optical axis 110 and enters the gas laser device 100. After being amplified by the gas laser device 100, the laser beam exits the gas laser device 100 and is propagated along the optical axis 111. The laser beam propagated along the optical axis 111 enters the gas laser device 102, the gas laser device 103, and the gas laser device 104 in this order to be amplified by the gas laser devices 102, 103, and 104. After exiting the gas laser device 104, the laser beam enters the machining apparatus 105.

The machining apparatus 105 is, for example, an apparatus that cuts metal workpieces. The machining apparatus 105 focuses the laser beam that has entered the machining apparatus 105, on a target 106 on the metal workpiece. The machining apparatus 105 may be any other apparatus that uses a laser beam to machine a workpiece, meaning that the machining apparatus 105 is not limited to the device that cuts the metal workpieces.

In place of the machining apparatus 105, another apparatus may be supplied with the amplified laser beam in the gas laser amplification system 200. The apparatus to be supplied with the amplified laser beam may be an apparatus that generates extreme ultraviolet light. The apparatus that generates extreme ultraviolet light irradiates the target 106, which is a tin droplet, with a focused laser beam to generate the extreme ultraviolet light.

In the gas laser amplification system 200 illustrated in FIG. 3, the four gas laser devices 100, 102, 103, and 104 are arranged in series. Any number of gas laser devices are arranged in series in the gas laser amplification system 200 and thus are not limited to four. The gas laser amplification system 200 illustrated in FIG. 3 has the single gas laser device 100, which is illustrated in FIGS. 1 and 2. The gas laser amplification system 200 may have two or more gas laser devices 100 such as illustrated in FIGS. 1 and 2.

Figure 4:
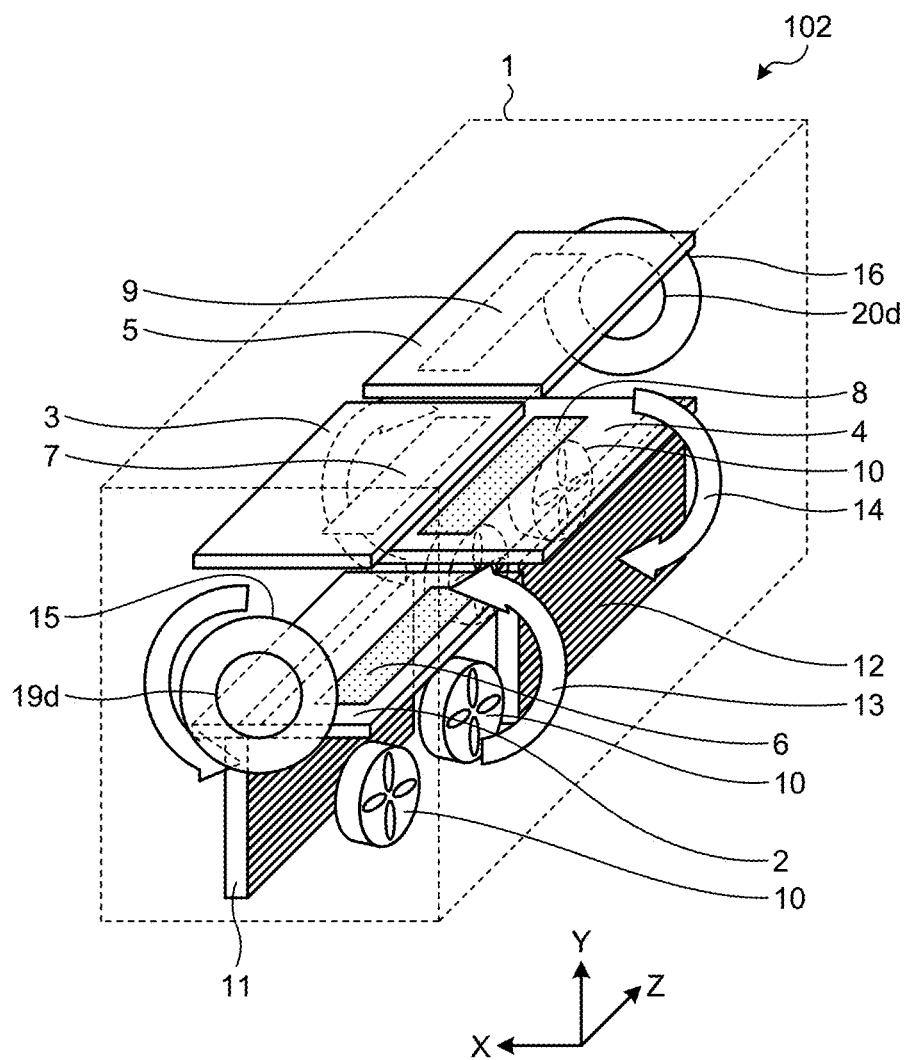
FIG. 4 is a perspective view of a gas laser device of the gas laser amplification system illustrated in FIG. 3, which device amplifies a laser beam emitted from the gas laser device according to the first embodiment.

A description is made as to a configuration of each of the gas laser devices 102, 103, and 104 that amplify a laser beam emitted from the gas laser device 100 in the gas laser amplification system 200. FIG. 4 is a perspective view of the gas laser device of the gas laser amplification system illustrated in FIG. 3, which device amplifies the laser beam emitted from the gas laser device according to the first embodiment. FIG. 4 is the perspective view of the gas laser device 102. Those which are common to the gas laser devices 102 and 100 are not described here. The gas laser devices 102, 103, and 104 have the same configuration.

The gas laser device 102 does not include the mirrors 21a, 21b, 22a, and 22b, which are included in the gas laser device 100 illustrated in FIGS. 1 and 2. The shielding plate 15 of the gas laser device 102 includes a single opening 19d. The shielding plate 16 includes a single opening 20d. The gas laser device 102 includes a window facing the opening 19d and a window facing the opening 20d. The windows function to allow the laser beams to be transmitted therethrough and also function to insulate an internal space of the housing 1 from the outside of the housing 1. The windows are not illustrated in FIG. 4.

A laser beam propagated along the optical axis 110 from the laser oscillator 101 enters the housing 1 through the window 17 as illustrated in FIG. 2. After entering the housing 1, the laser beam is a first laser beam that is propagated along the optical axis 31. The first laser beam passes through the opening 19c that is a first opening. After passing through the opening 19c, the first laser beam is propagated through the discharge region 23 and the discharge region 24 in sequence along the optical axis 31. The first laser beam is the laser beam first propagated through the discharge regions 23 and 24 after entering the housing 1. The laser beam is amplified by passing though the discharge regions 23 and 24. After passing through the discharge regions 23 and 24, the first laser beam passes through the opening 20a and is incident on the mirror 22a. After being propagated through the discharge regions 23 and 24 and incident on the mirror 22a, the first laser beam is reflected by the mirror 22a into a second laser beam that is propagated along the optical axis 32. Of the six openings 19a, 19b, 19c, 20a, 20b, and 20c of the gas laser device 100, the non-circular opening 20a is second in an order in which a laser beam reaches those six openings during propagation along the optical axes 31, 32, 33, 34, and 35. After being reflected by the mirror 22a, the laser beam passes through the opening 20a again.

After passing through the opening 20a, the second laser beam is propagated through the discharge region 24 and the discharge region 23 in sequence along the optical axis 32. After passing through the discharge regions 24 and 23, the second laser beam passes through the opening 19a and is incident on the mirror 21a. The opening 19a is a second opening, and the second laser beam, which is the laser beam having taken a round trip through the discharge regions 23 and 24 after passing through the opening 19c, passes through the second opening 19a. The opening 20a is a third opening. The first laser beam that has been propagated through the opening 19c and the discharge regions 23 and 24, and the second laser beam that is to be propagated through the discharge regions 23 and 24 to the opening 19a pass through the third opening 20a.

The laser beam is reflected by the mirror 21a and passes through the opening 19a again. After being propagated through the discharge regions 23 and 24 and incident on the mirror 21a, the second laser beam is reflected by the mirror 21a into a third laser beam that is propagated along the optical axis 33. The third laser beam passes through the opening 19a and is propagated through the discharge region 23 and the discharge region 24 in sequence along the optical axis 33. After passing through the discharge regions 23 and 24, the third laser beam passes through the opening 20b and is incident on the mirror 22b. The opening 20b is a fourth opening, and the third laser beam that has been propagated through the opening 19a and the discharge regions 23 and 24 passes through the fourth opening 20b.

The laser beam is reflected by the mirror 22b and passes through the opening 20b again. After passing through the opening 20b, the laser beam is propagated through the discharge region 24 and the discharge region 23 in sequence along the optical axis 34. After passing through the discharge regions 24 and 23, the laser beam passes through the opening 19b and is incident on the mirror 21b.

The laser beam is reflected by the mirror 21b and passes through the opening 19b again. After being propagated along the optical axis 34, the laser beam is reflected by the mirror 21b into a fourth laser beam that is propagated along the optical axis 35. After passing through the opening 19b, the fourth laser beam is propagated through the discharge region 23 and the discharge region 24 in sequence along the optical axis 35. After passing through the discharge regions 23 and 24, the fourth laser beam passes through the opening 20c. The opening 20c is a fifth opening, and the fourth laser beam, which is the laser beam that has taken a round trip through the discharge regions 23 and 24 after passing through the opening 20b, passes through the fifth opening 20c.

After passing through the opening 20c, the laser beam enters the window 18. The laser beam is transmitted through the window 18, exits the housing 1, and is propagated along the optical axis 111. In the gas laser device 100, the reflection at each of the mirrors 21a, 21b, 22a, and 22b causes the laser beam to pass through the discharge regions 23 and 24, such that each passage of the laser beam through the discharge regions 23, 24 amplifies the laser beam.

After exiting the gas laser device 100, the laser beam passes through the gas laser devices 102, 103, and 104 in sequence and enters the machining apparatus 105. The laser beam is amplified by passing through the discharge regions 23 and 24 once in each of the gas laser devices 102, 103, and 104.

A description is made as to self-oscillating light caused in the gas laser amplification system 200. While output power of a pulse laser beam from the laser oscillator 101 is on the order of 10 W to 100 W, output power of a pulse laser beam from the gas laser device 104 increases to 20 kW or more. The pulse laser beam from the laser oscillator 101 has a pulse width on the order of 1 nanosecond to 100 nanoseconds. The pulse laser beam from the laser oscillator 101 has a pulse frequency on the order of 10 kHz to 100 kHz. The gas laser devices 100, 102, 103, and 104 continuously generate high-frequency discharges. The generation of the discharges continues even with the pulse laser beam not being produced under circumstances where the pulse frequency of the pulse laser beam entering the gas laser device 100 is lower than a discharge frequency, or the entry of the pulse laser beam is suspended.

A high amplification factor is required of the gas laser amplification system 200 to enable a laser beam on the order of 10 W to be amplified to 20 kW or more. When spontaneous emission light is generated with the laser oscillator 101 not emitting the pulse laser beam, amplification of the spontaneous emission light may cause self-oscillating light in the gas laser amplification system 200 due to the high amplification factor of the gas laser amplification system 200.

For example, assume that spontaneous emission light generated in the gas laser device 104 is amplified and propagated in the gas laser device 103 and the gas laser device 102, after which the spontaneous emission light enters the gas laser device 100. When the spontaneous emission light propagated along the optical axis 111 enters the gas laser device 100 through the window 18, most of that spontaneous emission light is propagated along the optical axes 35, 34, 33, 32, and 31 in this order and exits the gas laser device 100 through the window 17.

Assume that diffracted light is generated due to a diffraction phenomenon that occurs when the spontaneous emission light reflected by the mirror 22a passes through the opening 20a. Most of the spontaneous emission light is propagated from the opening 20a along the optical axis 31 and passes through the opening 19c. The spontaneous emission light that has passed through the opening 19c is transmitted through the window 17 and exits the gas laser device 100. A portion of the spontaneous emission light is propagated from the opening 20a along the optical axis 32 and passes through the opening 19a. The spontaneous emission light that has passed through the opening 19a is reflected by the mirror 21a and passes through the opening 19a. After passing through the opening 19a, the spontaneous emission light is propagated along the optical axes 33, 34, and 35 in this order and exits the gas laser device 100 through the window 18. The spontaneous emission light thus exiting thus the gas laser device 100 is amplified and propagated in the gas laser devices 102, 103, and 104, after which the spontaneous emission light enters the machining apparatus 105.

The spontaneous emission light that has entered the machining apparatus 105 is incident on the target 106. A portion of the spontaneous emission light incident on the target 106 reflected by the target 106, such that the portion of the spontaneous emission light is propagated back following a path along which the spontaneous emission light is incident on the target 106. The spontaneous emission light propagated from the target 106 returns to the gas laser device 104 and is amplified by the gas laser device 104. After being amplified by the gas laser device 104, the spontaneous emission light passes through the gas laser device 103 and the gas laser device 102 again and is propagated to the gas laser device 100.

The spontaneous emission light is amplified each time the spontaneous emission light passes through the discharge regions 23 and 24 during the propagation between the mirror 21a and the target 106. The mirror 21a and the target 106 function as a resonator in such spontaneous emission light amplification. As described above, the gas laser amplification system 200 may generate self-oscillating light by amplifying the spontaneous emission light due to the diffraction phenomenon that occurs when the spontaneous emission light passes through the opening 20a.

The self-oscillating light due to the diffraction at the opening 20a oscillates along the same optical axis as that of the pulse laser beam that is output from the gas laser amplification system 200. The fact that the optical axis of the self-oscillating light and the optical axis of the pulse laser beam are the same means not only the situation where these optical axes coincide but also the situation where the self-oscillating light and the pulse laser beam deviate from each other to such an extent that the self-oscillating light is considered to be propagated like the pulse laser beam.

Since the self-oscillating light behaves differently from the proper pulse laser beam that the gas laser amplification system 200 generates, the self-oscillating light may be directed onto the target 106 at an unintended timing. If the self-oscillating light having been propagated along the optical axis of the pulse laser beam is subsequently propagated in a direction different from that of the pulse laser beam, the self-oscillating light can be directed onto and thus damage a component of the gas laser amplification system 200. Since amplification gain consumption by the self-oscillation causes a decreased amplification factor for the pulse laser beam, the output power of the pulse laser beam from the gas laser amplification system 200 is reduced.

The diffraction phenomenon of spontaneous emission light can also occur at the openings other than the opening 20a. The other elements of the gas laser amplification system 200 than the gas laser device 104 can also be sources of spontaneous emission light. The target 106 is not a limiting structural element that functions as a part of the resonator. A structural element that functions as the part of the resonator may be a structure disposed in an optical path along which the pulse laser beam is propagated, and such a structure is, for example the opening 19d or 20d of the gas laser device 104.

The gas laser device 100 includes the openings 19a, 19b, 19c, 20a, 20b, and 20c through which a laser beam propagated along the optical axes 31, 32, 33, 34, and 35 passes. Of these openings 19a, 19b, 19c, 20a, 20b, and 20c, the opening 20a is the non-circular opening, as described above. In the first embodiment, the gas laser device 100, which is provided with the non-circular opening, controls self-oscillating light that oscillates along the same optical axis as that of the pulse laser beam.

A description is made as to controlling self-oscillating light by the gas laser device 100 according to the first embodiment. In the first embodiment, the non-circular opening diffracts light differently from a circular opening, thus controlling self-oscillating light. The light diffraction by the non-circular opening is described here by comparison with the light diffraction by the circular opening.

Figure 5:
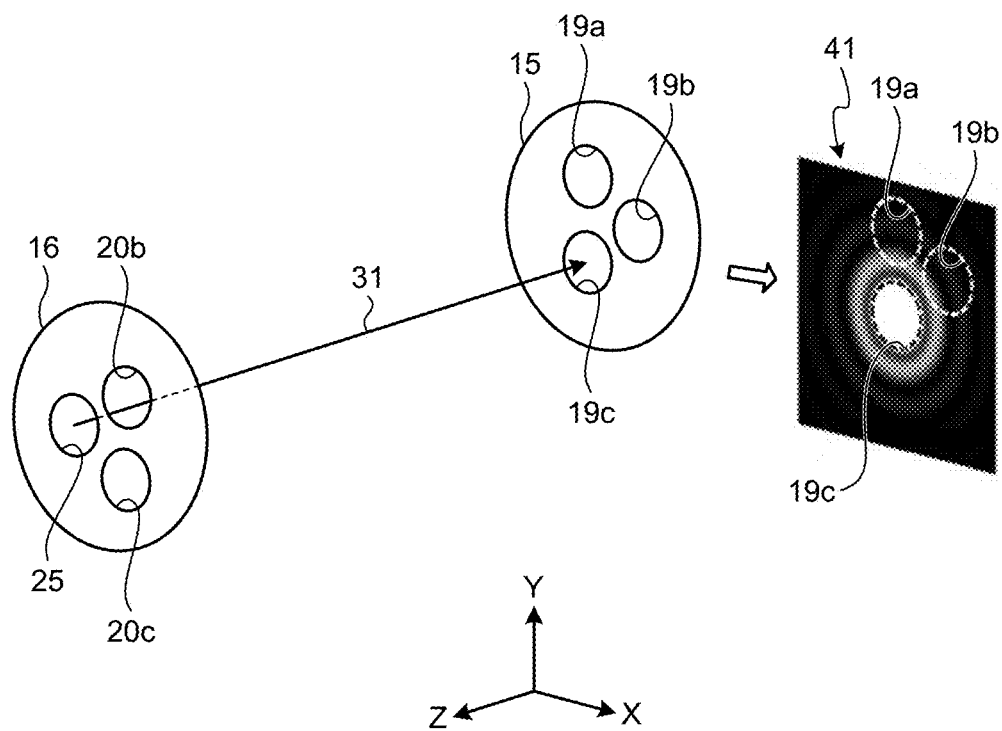
FIG. 5 illustrates light being diffracted in Comparative Example 1 of the first embodiment.
Figure 6:
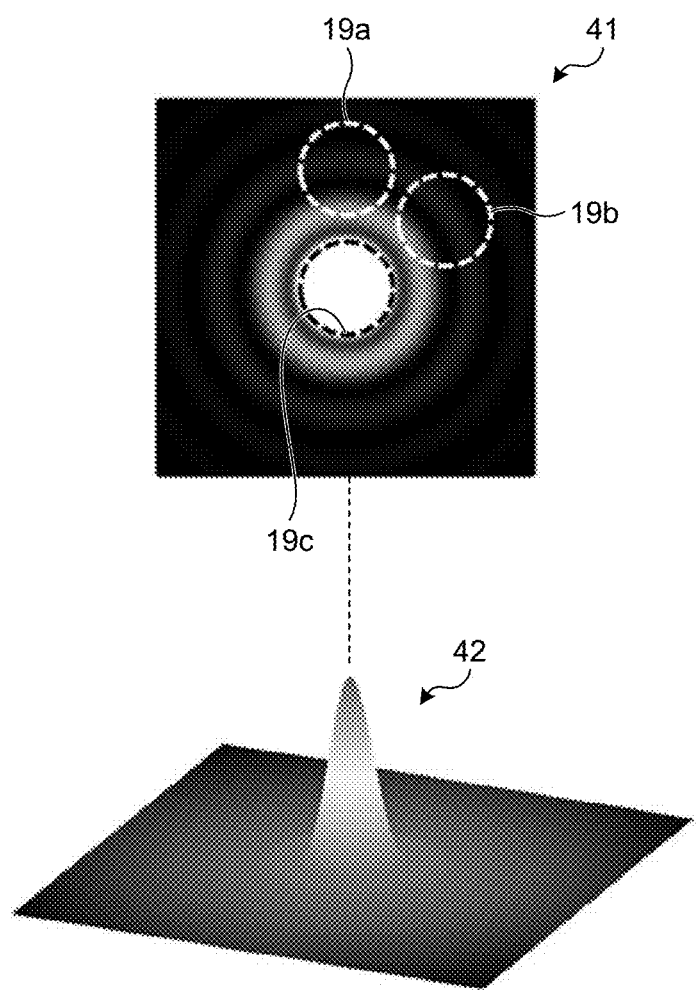
FIG. 6 illustrates an example of intensity distribution of the light diffracted in Comparative Example 1 of the first embodiment.

FIG. 5 illustrates light being diffracted in Comparative Example 1 of the first embodiment. FIG. 6 illustrates an example of intensity distribution of the light diffracted in Comparative Example 1 of the first embodiment. In Comparative Example 1, the shielding plate 16 has an opening 25 that is the circular opening, in place of the above-mentioned opening 20a.

FIG. 5 illustrates the spontaneous emission light entering the opening 19c after being propagated through the opening 25 along the optical axis 31 and a diffraction pattern 41 generated on the shielding plate 15 as a result of the passage of the spontaneous emission light through the opening 25. FIG. 6 illustrates the diffraction pattern 41 and the intensity distribution 42 of the diffracted light on the shielding plate 15. In the diffraction pattern 41, light intensities are represented by brightness and darkness. A brighter area shows that the light intensity is higher. The intensity distribution 42 is a three-dimensional representation of the distribution of the light intensities on the shielding plate 15. The optical axis 31 is in a center of the diffraction pattern 41.

The light that has passed through the opening 25 forms the diffraction pattern 41 in concentric circles alternating between brightness and darkness as the light becomes weaker in a direction away from the center of the diffraction pattern 41. The diffraction pattern 41 is an annular pattern that becomes darker in the direction away from its center.

Figure 7:
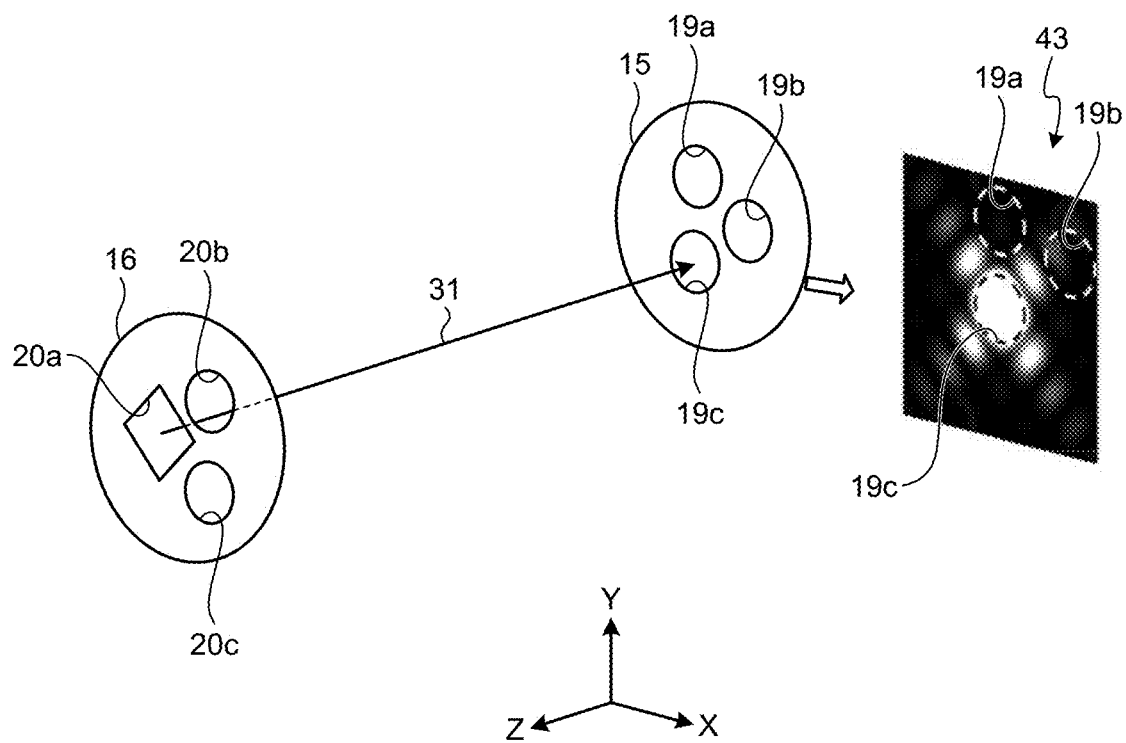
FIG. 7 illustrates light being diffracted in the gas laser device according to the first embodiment.
Figure 8:
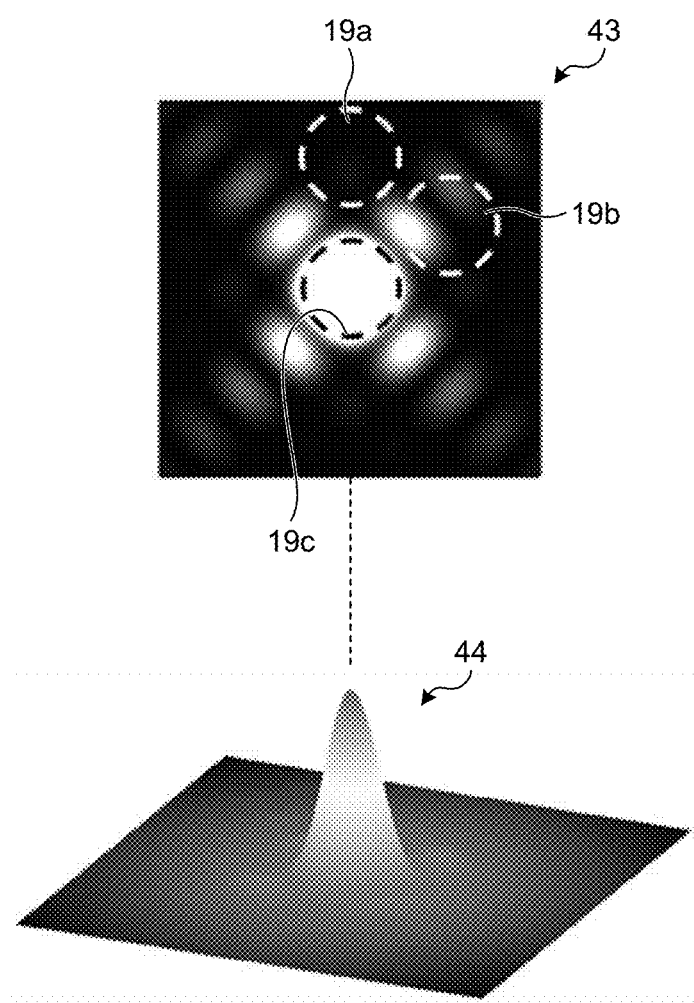
FIG. 8 illustrates an example of intensity distribution of the light diffracted in the gas laser device according to the first embodiment.
Figure 9:
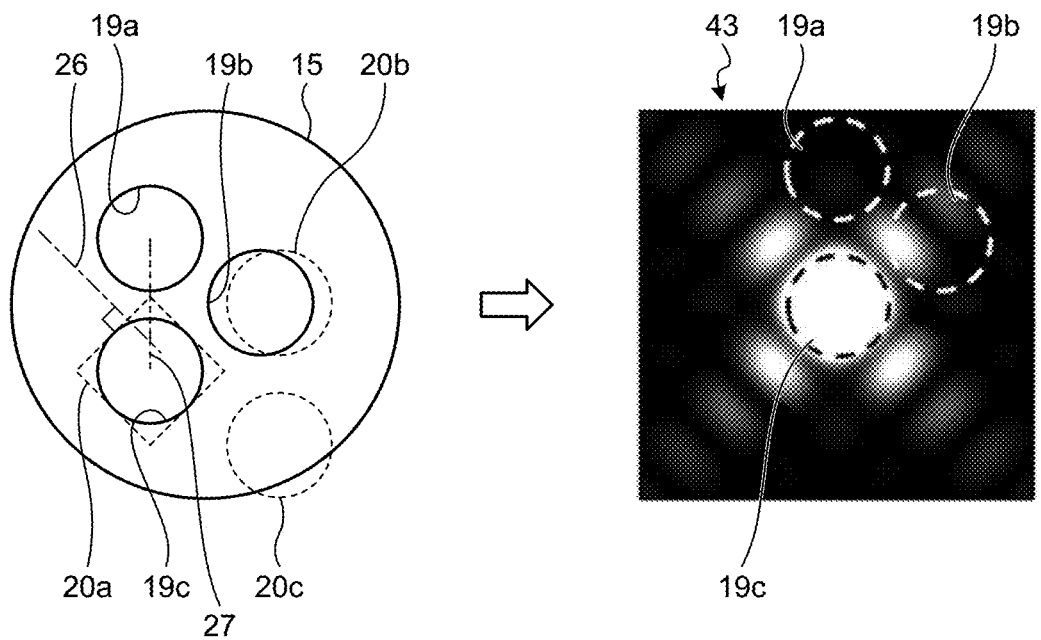
FIG. 9 illustrates arrangements of openings in two shielding plates of the gas laser device according to the first embodiment.

FIG. 7 illustrates light being diffracted in the gas laser device according to the first embodiment. FIG. 8 illustrates an example of intensity distribution of the light diffracted in the gas laser device according to the first embodiment. FIG. 9 illustrates opening arrangements in the two shielding plates of the gas laser device according to the first embodiment.

FIG. 7 illustrates a laser beam entering the opening 19c after being propagated through the opening 20a along the optical axis 31 and a diffraction pattern 43 generated on the shielding plate 15 as a result of the passage of the laser beam through the opening 20a. FIG. 8 illustrates the diffraction pattern 43 and the intensity distribution 44 of the diffracted light on the shielding plate 15. In the diffraction pattern 43, light intensities are represented by brightness and darkness. A brighter area shows that the light intensity is higher. The intensity distribution 44 is a three-dimensional representation of the distribution of the light intensities on the shielding plate 15. The optical axis 31 is in a center of the diffraction pattern 43. The plane shape of the opening 20a is square. The plane shape of the opening 20a includes four rectilinear segments corresponding to sides of a square.

FIG. 9 illustrates the openings 20a, 20b, and 20c of the shielding plate 16 that are projected onto the shielding plate 15 and also illustrates the diffraction pattern 43. In FIG. 9, the openings 20a, 20b, and 20c projected onto the shielding plate 15 are indicated by broken lines.

The diffraction pattern 43 is symmetric about its diagonals as axes of symmetry. The light intensity around the opening 19c is higher along a line perpendicular to each of the sides of the square opening 20a. The light intensities are lower in diagonal directions of the square shape.

A line segment 26 illustrated in FIG. 9 is the line perpendicular to one of the sides of the square opening 20a. A line segment 27 in FIG. 9 interconnects a centroid of the plane shape of the opening 20a and a centroid of the plane shape of the opening 19a. In FIG. 9. the circular openings 19a, 19b, 19c, 20b, and 20c all have the same areas. A description below is based on the assumption that centers of the openings 19a, 19b, 19c, 20a, 20b, and 20c are centroids of the plane shapes of the openings 19a, 19b, 19c, 20a, 20b, and 20c.

In the shielding plate 15, a distance between the center of the opening 19a and the center of the opening 19b, a distance between the center of the opening 19b and the center of the opening 19c, and a distance between the center of the opening 19c and the center of the opening 19a are all equal. In the shielding plate 16, a distance between the center of the opening 20a and the center of the opening 20b, a distance between the center of the opening 20b and the center of the opening 20c, and a distance between the center of the opening 20c and the center of the opening 20a are all equal.

Figure 10:
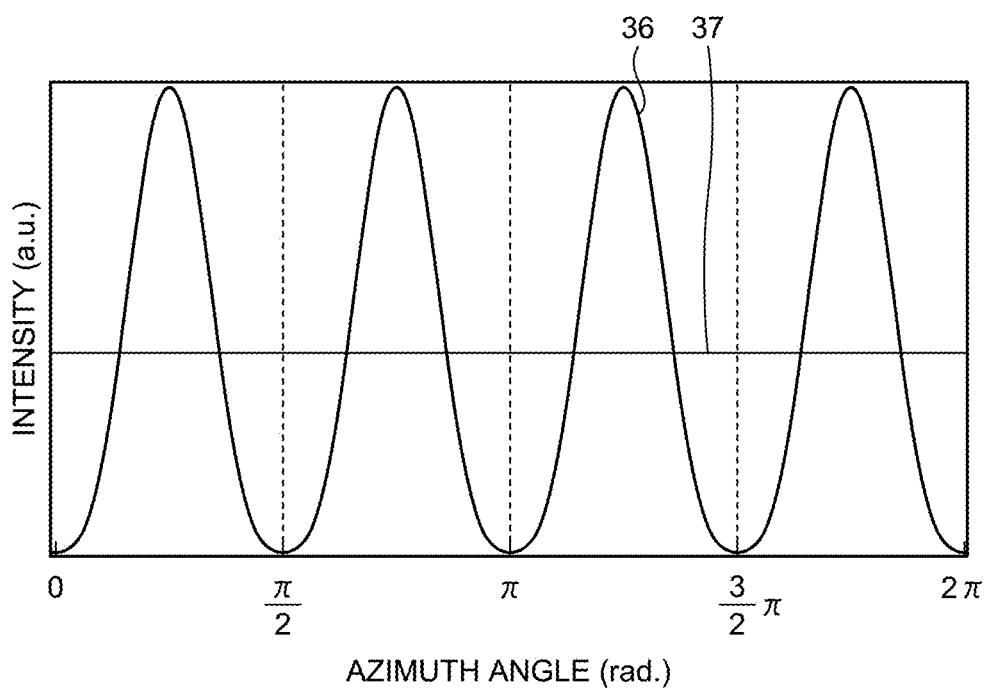
FIG. 10 illustrates a relationship between intensity of the diffracted light with the intensity distribution illustrated in FIG. 6 and an azimuth angle and a relationship between intensity of the diffracted light with the intensity distribution illustrated in FIG. 8 and the azimuth angle.
Figure 11:
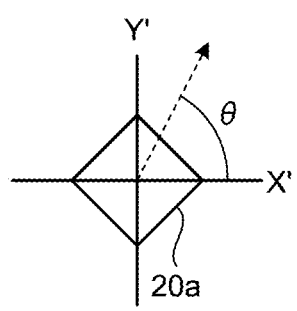
FIG. 11 explains the azimuth angle in the relationships illustrated in FIG. 10.

FIG. 10 illustrates a relationship between the intensity of the diffracted light with the intensity distribution illustrated in FIG. 6 and an azimuth angle and a relationship between the intensity of the diffracted light with the intensity distribution illustrated in FIG. 8 and the azimuth angle. FIG. 11 illustrates the azimuth angle in the relationships illustrated in FIG. 10. FIG. 11 illustrates a relationship between the intensity of a first bright ring of each of the diffraction patterns 41 and 43 and the azimuth angle. The first bright ring is closest to an Airy disk among bright rings formed around the Airy disk. The Airy disk is an inner region of a dark ring located closer to the center of each diffraction pattern 41 or 43 than the first bright ring is.

In FIG. 11, an X' axis is an axis along one of the diagonals of the square opening 20a, and a Y' axis is an axis along the other diagonal of the square opening 20a. An angle θ is an azimuth angle relative to the X' axis in a first quadrant.

A graph 36 illustrated in FIG. 10 represents the relationship between the azimuth angle and the light intensity of the diffraction pattern 43 illustrated in FIG. 8. A graph 37 illustrated in FIG. 10 represents the relationship between the azimuth angle and the light intensity of the diffraction pattern 41 illustrated in FIG. 6. In the diffraction pattern 41, the light intensity is constant regardless of the azimuth angle. Thus, the graph 37 is a linear graph showing the constant intensity.

In Comparative Example 1 illustrated in FIGS. 5 and 6, the diffracted light is uniform regardless of azimuthal directions. While most of the spontaneous emission light enters the opening 19c after being propagated along the optical axis 31, a portion of the spontaneous emission light enters the opening 19a or 19b. As described above, the portion of the spontaneous emission light that has entered the opening 19a is amplified by the resonator composed of the mirror 21a and the target 106.

In the diffraction pattern 43, on the other hand, the light intensity is higher along the line perpendicular to each of the sides of the square shape and lower in each of the diagonal directions of the square shape as described above. In the graph 36, the light intensities in azimuthal directions coinciding with the diagonals are minimum values, and the light intensities in azimuthal directions coinciding with the lines perpendicular to the sides of the square shape are maximum values. Thus, the diffraction pattern 43 has the lowered light intensities in the azimuthal directions along the diagonals, compared with the diffraction pattern 41.

When the plane shape of the opening 20a is projected onto the shielding plate 15 as illustrated in FIG. 9, the line segment 27 interconnecting the center of the opening 19a and the center of the opening 20a is directed differently from the line segment 26 that is the line perpendicular to the side of the square opening 20a. In other words, the center of the opening 19a is in a position other than positions on the line perpendicular to the side of the square opening 20a.

Since the orientation of the plane shape of the opening 20a in an XY plane is thus fixed, the directions of the higher light intensities in the diffraction pattern 43 differ from the direction to the center of the opening 19a as seen from the center of the opening 20a. The XY plane is a plane parallel to the X and Y directions. Since the direction to the center of the opening 19a as seen from the center of the opening 20a is different from the directions of the higher light intensities, spontaneous emission light that is propagated to the opening 19a due to the diffraction phenomenon at the opening 20a is reduced.

In FIG. 9, the diagonal of the square opening 20a and the line segment 27 coincide. This means that with the square opening 20a projected onto the shielding plate 15, the center of the opening 19a and the center of the opening 20a line up in the diagonal direction of the square shape. In other words, the openings 19a and 20a are aligned in a direction to one corner of the opening 20a as seen from the center of the opening 20a.

Since the orientation of the plane shape of the opening 20a in the XY plane is thus fixed, the direction of the lower light intensity in the diffraction pattern 43 coincides with the direction to the center of the opening 19a as seen from the center of the opening 20a. The coincidence of the direction to the center of the opening 19a as seen from the center of the opening 20a and the direction of the lower light intensity reduces spontaneous emission light that is propagated to the opening 19a due to the diffraction phenomenon at the opening 20a.

The gas laser device 100 according to the first embodiment has reduced spontaneous emission light that is propagated to the opening 19a due to the diffraction phenomenon at the opening 20a as compared to when the gas laser device 100 has the circular opening 25. Reducing the spontaneous emission light that is propagated to the opening 19a enables a reduction in spontaneous emission light that is propagated between the mirror 21a and the target 106. With the reduction of the spontaneous emission light that is propagated between the mirror 21a and the target 106, the spontaneous emission light amplification is controlled, so that the gas laser device 100 is capable of controlling the oscillation of self-oscillating light in the gas laser amplification system 200.

The laser beam at the optical axis 31 is the laser beam that is first propagated through the discharge regions 23 and 24 after entering the housing 1. Of the openings 19a, 19b, 19c, 20a, 20b, and 20c, therefore, the opening 20a that allows the laser beam along the optical axis 31 to pass therethrough affects the spontaneous emission light amplification due to the diffraction phenomenon the most. Since the plane shape of the opening 20a includes the rectilinear segments, the gas laser device 100 is capable of effectively reducing spontaneous emission light.

Figure 12:
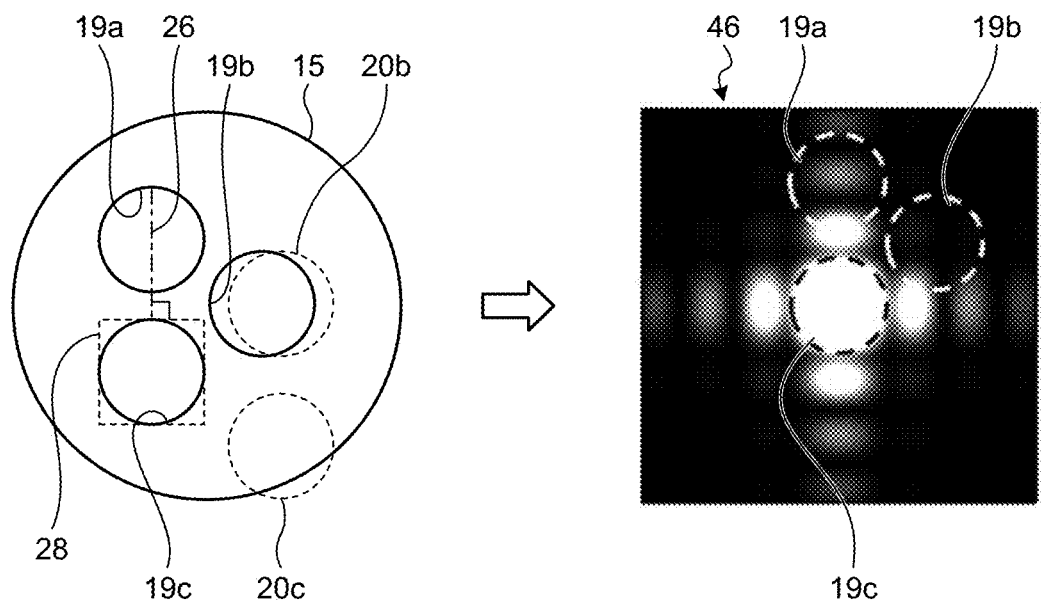
FIG. 12 illustrates arrangements of openings in Comparative Example 2 of the first embodiment.

A description is next made as to Comparative Example 2 of the first embodiment. In this example, the orientation of the plane shape of the opening 20a in the XY plane is not fixed like the one in FIG. 9. FIG. 12 illustrates opening arrangements in Comparative Example 2 of the first embodiment. In Comparative Example 2, the shielding plate 16 has an opening 28 in place of the opening 20a. FIG. 12 illustrates the openings 28, 20b, and 20c of the shielding plate 16 that are projected onto the shielding plate 15 and also illustrates a diffraction pattern 46 generated on the shielding plate 15 as a result of passage of a laser beam through the opening 28. In FIG. 12, the openings 28, 20b, and 20c projected onto the shielding plate 15 are indicated by broken lines.

The opening 28 has a square plane shape. The square opening 28 corresponds to the square opening 20a rotated 45 degrees in the direction of the azimuth angle. The diffraction pattern 46 corresponds to the above-described diffraction pattern 43 rotated 45 degrees in the direction of the azimuth angle. The line segment 26 is a line perpendicular to one side of the square opening 28.

In FIG. 12, the line segment 26 coincides with a line segment interconnecting a center of the opening 28 and the center of the opening 19a. In other words, with the plane shape of the opening 28 projected onto the shielding plate 15, the center of the opening 19a is on the line perpendicular to the one side of the square opening 28. In this case, a direction of a higher light intensity in the diffraction pattern 46 coincides with the direction to the center of the opening 19a as seen from the center of the opening 28. The coincidence of the direction to the center of the opening 19a as seen from the center of the opening 28 and the direction of the higher light intensity increases spontaneous emission light that is propagated to the opening 19a due to a diffraction phenomenon at the opening 28.

When the plane shape of the opening 20a is projected onto the shielding plate 15, therefore, the orientation of the plane shape of the opening 20a in the XY plane is fixed in the first embodiment such that the line segment 27 interconnecting the center of the opening 19a and the center of the opening 20a is directed differently from the line segment 26 that is the line perpendicular to the rectilinear segment of the opening 20a. The plane shape of the opening 20a is not limited to the square shape and may be rectangular.

The gas laser device 100 according to the first embodiment includes the opening 20a. The plane shape of the opening 20a includes the rectilinear segments. With the plane shape of the opening 20a projected onto the shielding plate 15, the line segment 27 interconnecting the centroid of the plane shape of the opening 19a and the centroid of the plane shape of the opening 20a is directed differently from the line perpendicular to the rectilinear segment. Since the orientation of the plane shape of the opening 20a in the XY plane is thus fixed, the gas laser device 100 is capable of reducing spontaneous emission light that is propagated to the opening 19a due to the diffraction phenomenon at the opening 20a. This enables the gas laser device 100 to control the oscillation of self-oscillating light that stems from spontaneous emission light.

Second Embodiment

Figure 13:
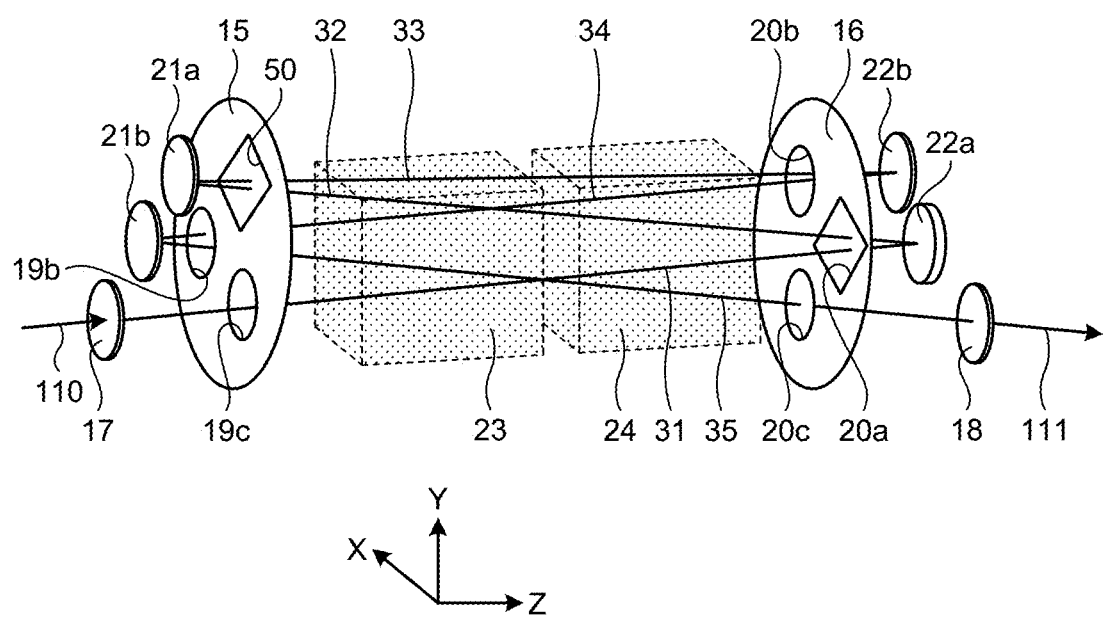
FIG. 13 is a perspective view of a part of an internal configuration of a gas laser device according to a second embodiment of the present invention.

FIG. 13 is a perspective view of a part of an internal configuration of the gas laser device according to the second embodiment of the present invention. The gas laser device 100 according to the second embodiment includes two non-circular openings: the opening 20a and an opening 50.

The gas laser device 100 according to the second embodiment is similar to the gas laser device 100 according to the first embodiment, except that the opening 50 replaces the opening 19a illustrated in FIG. 2. In the second embodiment, elements identical with those in the above-described first embodiment have the same reference characters, and a description is made as to mainly difference of the second embodiment from the first embodiment.

Assume that diffracted light is generated due to the diffraction phenomenon that occurs when spontaneous emission light reflected by the mirror 22a passes through the opening 20a. The spontaneous emission light propagated from the opening 20a along the optical axis 32, passes through the opening 50 and is incident on the mirror 21a. Most of the spontaneous emission light reflected by the mirror 21a and passing through the opening 50 is propagated along the optical axis 33 and enters the opening 20b. When the diffracted light generated due to the diffraction phenomenon at the opening 20a is propagated along the optical axis 32 and then along the optical axis 33, a portion of the spontaneous emission light having passed through the opening 50 may enter the opening 20c adjacent to the opening 20b. After passing through the opening 20c, the spontaneous emission light is transmitted through the window 18 and exits the gas laser device 100. The spontaneous emission light thus exiting the gas laser device 100 could cause the gas laser amplification system 200 to generate self-oscillating light.

Figure 14:
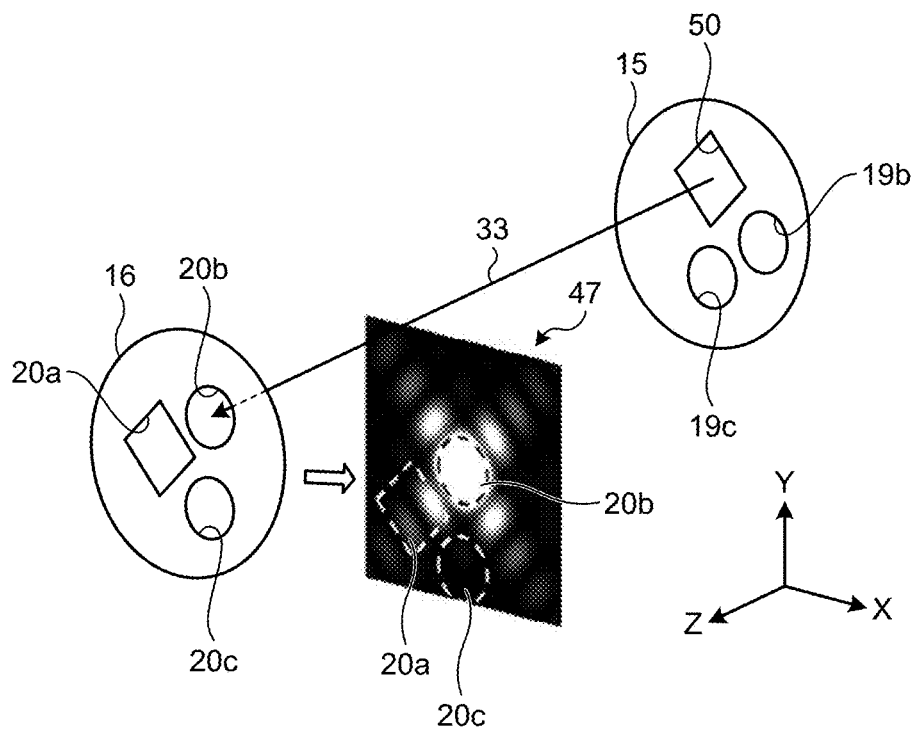
FIG. 14 illustrates diffracted light propagated in the gas laser device according to the second embodiment.

FIG. 14 illustrates diffracted light propagated in the gas laser device according to the second embodiment. FIG. 14 illustrates a laser beam entering the opening 20b after being propagated through the opening 50 along the optical axis 33 and a diffraction pattern 47 generated on the shielding plate 16 as a result of the passage of the laser beam through the opening 50. The opening 50 is a second opening, and the laser beam, which has taken a round trip through the discharge regions 23 and 24 after passing through the opening 19c, passes through the second opening 50. The opening 50 has the same square plane shape as the opening 20a. A description below is based on the assumption that a center of the opening 50 is a centroid of the plane shape of the opening 50.

In the shielding plate 15, a distance between the center of the opening 50 and the center of the opening 19b, a distance between the center of the opening 19b and the center of the opening 19c, and a distance between the center of the opening 19c and the center of the opening 50 are all equal. The diffraction pattern 47 is the same as the diffraction pattern 43 illustrated in FIG. 9.

When the plane shape of the opening 50 is projected onto the shielding plate 16, a line segment interconnecting the center of the opening 50, which is the second opening, and the center of the opening 20c, which is the fifth opening, is directed differently from a line perpendicular to a side of the square opening 50. Since the orientation of the plane shape of the opening 50 in an XY plane is thus fixed, directions of higher light intensities in the diffraction pattern 47 differ from the direction to the center of the opening 20c as seen from the center of the opening 50. Since the direction to the center of the opening 20c as seen from the center of the opening 50 is different from the directions of the higher light intensities, spontaneous emission light that is propagated to the opening 20c due to the diffraction phenomenon at the opening 20a is reduced.

With the plane shape of the opening 50 projected onto the shielding plate 16, the line segment interconnecting the center of the opening 50 and the center of the opening 20c coincides with a diagonal of the square opening 50. This means that with the square opening 50 projected onto the shielding plate 16, the center of the opening 20c and the center of the opening 50 line up in the diagonal direction of the square shape. Since the orientation of the plane shape of the opening 50 in the XY plane is thus fixed, a direction of a lower light intensity in the diffraction pattern 47 coincides with the direction to the center of the opening 20c as seen from the center of the opening 50. The coincidence of the direction to the center of the opening 20c as seen from the center of the opening 50 and the direction of the lower light intensity reduces spontaneous emission light that propagates from the opening 50 to the opening 20c.

The gas laser device 100 according to the second embodiment has reduced spontaneous emission light that is propagated from the opening 50 to the opening 20c. Reducing the spontaneous emission light that is propagated to the opening 20c enables a reduction in spontaneous emission light that is propagated between the mirror 21a and the target 106. As in the first embodiment, spontaneous emission light that is propagated to the opening 50 due to the diffraction phenomenon at the opening 20a is reduced in the second embodiment. With the reduction of the spontaneous emission light that is propagated between the mirror 21a and the target 106, spontaneous emission light amplification is controlled, so that the gas laser device 100 according to the second embodiment is capable of controlling the oscillation of self-oscillating light in the gas laser amplification system 200.

It is to be noted that the gas laser device 100 may have three or more non-circular openings. Also in this case, the gas laser device 100 is capable of controlling the oscillation of self-oscillating light.

Third Embodiment

Figure 15:
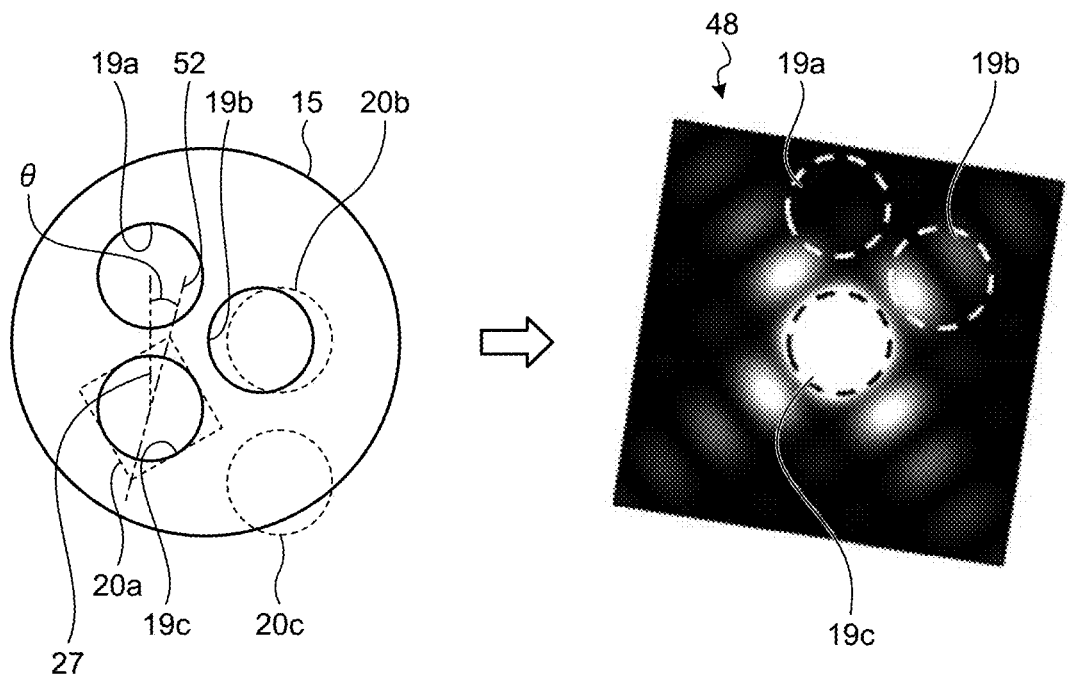
FIG. 15 illustrates arrangements of openings in a gas laser device according to a third embodiment of the present invention.

FIG. 15 illustrates opening arrangements in the gas laser device according to the third embodiment of the present invention. In the third embodiment, the plane shape of the opening 20a is tilted compared with the plane shape of the opening 20a of the first embodiment. The gas laser device 100 according to the third embodiment is similar to the gas laser device 100 according to the first embodiment, except that the plane shape of the opening 20a is tilted compared with that of the first embodiment. In the third embodiment, constituent elements identical with those in the above-described first and second embodiments have the same reference characters, and a description is made as to mainly difference of the third embodiment from the first and second embodiments.

FIG. 15 illustrates the openings 20a, 20b, and 20c of the shielding plate 16 that are projected onto the shielding plate 15 and also illustrates a diffraction pattern 48 generated on the shielding plate 15 as a result of passage of a laser beam through the opening 20a. In the diffraction pattern 48, light intensities are represented by brightness and darkness. A brighter area shows that the light intensity is higher. In FIG. 15, the openings 20a, 20b, and 20c projected onto the shielding plate 15 are indicated by broken lines.

With the plane shape of the opening 20a projected onto the shielding plate 15, the line segment 27 interconnects the center of the opening 19a and the center of the opening 20a. A line segment 52 is one diagonal of the square opening 20a. The line segment 52 coincides with the X' axis illustrated in FIG. 11. When an angle defined by the line segment 52 and the line segment 27 is θ, a relationship between the angle θ and the diffracted light intensity is the same as that represented by the graph 36 of FIG. 10.

In the third embodiment, the angle θ satisfies Formula (1) below. In Formula (1), n is any integer.

$$n(\pi/2)-0.14\pi \leq \theta \leq n(\pi/2)+0.14\pi \quad (1)$$

With the angle θ in the above range expressed by Formula (1), the intensity of diffracted light caused by passage of spontaneous emission light through the square opening 20a is lower than the intensity of diffracted light caused by the passage of the spontaneous emission light through a circular opening. Since the angle θ define by the line segments 52 and 27 is in the above range expressed by Formula (1), the gas laser device 100 is capable of reducing spontaneous emission light that is propagated to the opening 19a due to the diffraction phenomenon as compared to when the gas laser device 100 has the circular opening.

Fourth Embodiment

Figure 16:
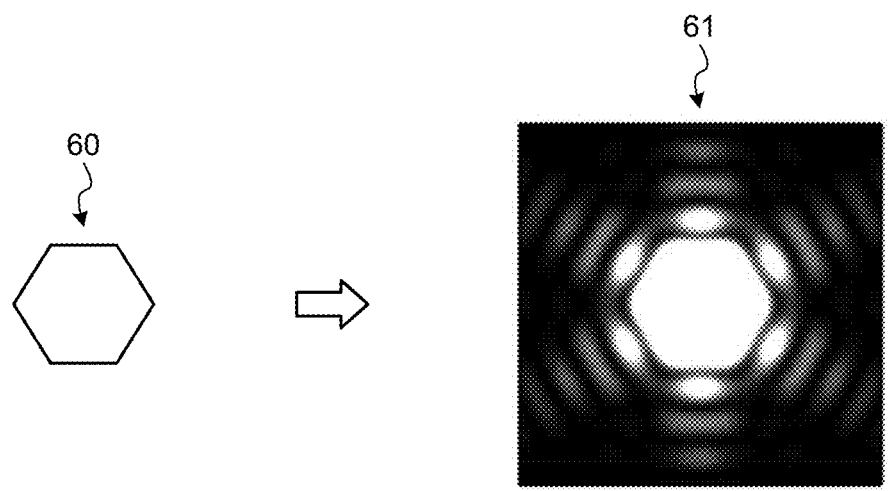
FIG. 16 illustrates an opening included in a gas laser device according to a fourth embodiment of the present invention.

FIG. 16 illustrates an opening included in the gas laser device according to the fourth embodiment of the present invention. The opening 60 included in the gas laser device 100 according to the fourth embodiment has a regular hexagonal plane shape. In the fourth embodiment, elements identical with those in the above-described first through third embodiments have the same reference characters, and a description is made as to mainly difference of the fourth embodiment from the first through third embodiments.

FIG. 16 illustrates the plane shape of the opening 60 and a diffraction pattern 61 generated as a result of passage of a laser beam through the opening 60. In the diffraction pattern 61, light intensities are represented by brightness and darkness. A brighter area shows that the light intensity is higher.

The plane shape of the opening 60 includes six rectilinear segments corresponding to sides of a regular hexagon. The light intensities around the opening 60 are higher along lines perpendicular to the sides of the regular hexagonal opening 60. The light intensities are lower in directions to corners of the regular hexagonal shape. In other words, in the diffraction pattern 61, the light intensities are lower in directions of those diagonals of the regular hexagonal shape that serve as axes of symmetry of the regular hexagonal shape.

Assume that the opening 60 replaces the opening 20a in FIG. 9. With the plane shape of the opening 60 projected onto the shielding plate 15, a line segment interconnecting the centroid of the plane shape of the opening 19a and a centroid of the plane shape of the opening 60 is directed differently from the line perpendicular to the side of the regular hexagonal opening 60. With the regular hexagonal opening 60 projected onto the shielding plate 15, the center of the opening 19a and a center of the opening 60 line up in the direction of the diagonal that is the axis of symmetry of the regular hexagonal shape. Spontaneous emission light that is propagated to the opening 19a due to a diffraction phenomenon at the opening 60 is therefore reduced.

The plane shape of the opening 60 is not limited to the regular hexagonal shape. The plane shape may be any polygon including one or more pairs of parallel sides. The polygonal plane shape has an even number of corners that is greater than or equal to four. When taking into consideration symmetry of the diffraction pattern 61, the polygonal shape is preferably a regular polygon. The above-described opening 50 in the shielding plate 15 of the second embodiment may have the same polygonal plane shape as the opening 60 of the present (fourth) embodiment.

Fifth Embodiment

Figure 17:
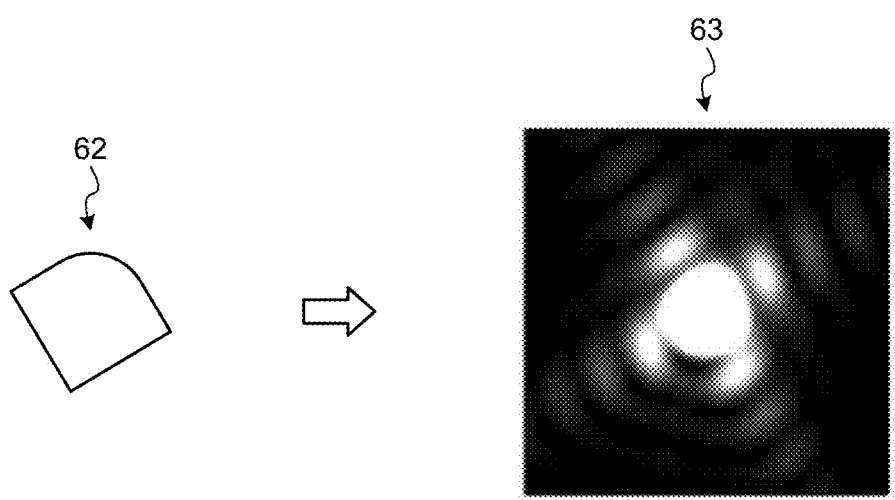
FIG. 17 illustrates an opening included in a gas laser device according to a fifth embodiment of the present invention.

FIG. 17 illustrates an opening included in the gas laser device according to the fifth embodiment of the present invention. A plane shape of the opening 62 included in the gas laser device 100 according to the fifth embodiment includes a curvilinear segment. In the fifth embodiment, elements identical with those in the above-described first through fourth embodiments have the same reference characters, and a description is made as to mainly difference of the fifth embodiment from the first through fourth embodiments.

FIG. 17 illustrates the plane shape of the opening 62 and a diffraction pattern 63 generated as a result of passage of a laser beam through the opening 62. In the diffraction pattern 63, light intensities are represented by brightness and darkness. A brighter area shows that the light intensity is higher.

The plane shape of the opening 62 is a deformed square with one rounded corner. The light intensity around the opening 62 is higher along a line perpendicular to one of rectilinear segments defining the corner therebetween. The light intensity is lower in a direction of a line segment interconnecting a centroid of the plane shape of the opening 62 and the corner, that is to say, in a direction to the corner between the two rectilinear segments. In the fifth embodiment, the centroid of the plane shape of the opening 62 is a centroid of an area of the plane shape of the opening 62.

Assume that the opening 62 replaces the opening 20a in FIG. 9. With the plane shape of the opening 62 projected onto the shielding plate 15, a line segment interconnecting the center of the opening 19a and the centroid of the opening 62 is directed differently from the line perpendicular to the rectilinear segment. With the plane shape of the opening 62 projected onto the shielding plate 15, the center of the opening 19a and the centroid of the opening 62 line up in the direction of the line segment interconnecting the centroid of the plane shape of the opening 62 and the corner of the plane shape of the opening 62. Spontaneous emission light that propagates to the opening 19a due to a diffraction phenomenon at the opening 62 is therefore reduced.

The plane shape of the opening 62 is not limited to the plane shape described in the present (fifth) embodiment. The plane shape may be any plane shape including at least two rectilinear segments defining a corner therebetween. The plane shape may be a deformed polygon that includes one or more pairs of parallel sides and at least one rounded corner. The above-described opening 50 in the shielding plate 15 of the second embodiment may have the same plane shape as the opening 62 of the present (fifth) embodiment.

Sixth Embodiment

Figure 18:
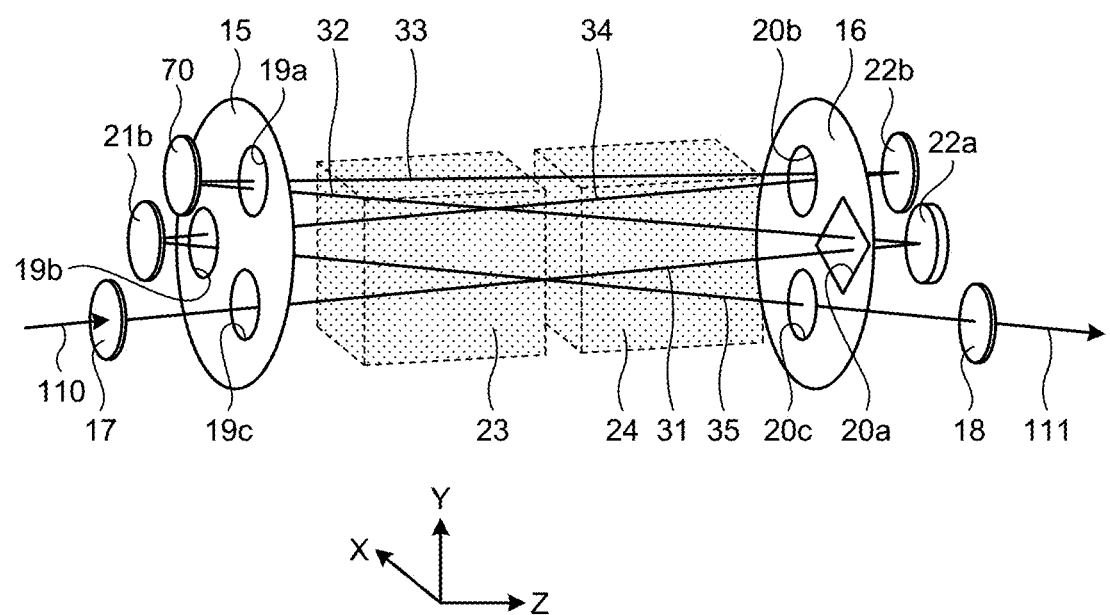
FIG. 18 is a perspective view of an essential part of a gas laser device according to a sixth embodiment of the present invention.

FIG. 18 is a perspective view of an essential part of the gas laser device according to the sixth embodiment of the present invention. A description is made as to controlling self-oscillating light by providing the gas laser device 100 according to the sixth embodiment with a mirror 70 serving as a concave mirror. In the sixth embodiment, elements identical with those in the above-described first through fifth embodiments have the same reference characters, and a description is made as to mainly difference of the sixth embodiment from the first through fifth embodiments.

Figure 19:
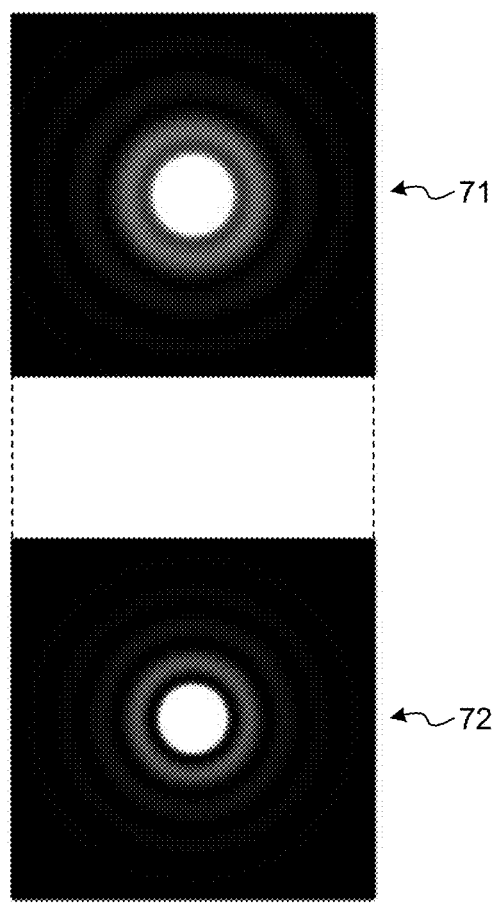
FIG. 19 illustrates a diffraction pattern in the gas laser device according to the sixth embodiment.

FIG. 19 illustrates a diffraction pattern in the gas laser device according to the sixth embodiment. FIG. 19 illustrates a diffraction pattern 71 of a plane wave that has passed through the circular opening, and the diffraction pattern 72 of a focused beam that has passed through the circular opening. In the diffraction patterns 71 and 72, light intensities are represented by brightness and darkness. A brighter area shows that the light intensity is higher.

As illustrated in FIG. 19, the focused beam becomes diffracted light with reduced spreading compared with the plane wave. Spontaneous emission light becomes a focused beam after being reflected by the mirror 70 and is propagated through the discharge regions 23 and 24 and the opening 20b. When passing through the opening 20b, the spontaneous emission light becomes diffracted light with reduced spreading on a surface of the shielding plate 16, so that spontaneous emission light that is propagated to the opening 20c is reduced. Spontaneous emission light that is propagated to the opening 20c due to the diffraction phenomenon at the opening 20a is therefore reduced.

It is to be noted that the gas laser devices 100 according to the first through sixth embodiments are not limited to the three-axis orthogonal gas laser devices and may be, for example, fast axial flow gas laser devices or wall cooling gas laser devices.

The above configurations illustrated in the embodiments are illustrative of contents of the present invention, can be combined with other techniques that are publicly known, and can be partly omitted or changed without departing from the gist of the present invention.

REFERENCE SIGNS LIST 1 housing; 2, 3, 4, 5 electrode substrate; 6, 7, 8, 9 electrode; 10 blower; 11, 12 heat exchanger; 13, 14 gas flow; 15, 16 shielding plate; 17, 18 window; 19a, 19b, 19c, 19d, 20a, 20b, 20c, 20d, 25, 28, 50, 60, 62 opening; 21a, 21b, 22a, 22b, 70 mirror; 23, 24 discharge region; 26, 27, 52 line segment; 31, 32, 33, 34, 35, 110, 111 optical axis; 36, 37 graph; 41, 43, 46, 47, 48, 61, 63, 71, diffraction pattern; 42, 44 intensity distribution; 100, 102, 103, 104 gas laser device; 101 laser oscillator; 105 machining apparatus; 106 target; 200 gas laser amplification system.

The invention claimed is:

1. A gas laser device comprising:
a discharge electrode to excite a laser gas supplied to a discharge region;
a first shielding member including a first opening to allow a first laser beam to pass therethrough, the first laser beam being a laser beam that is to be propagated to the discharge region, and a second opening to allow a second laser beam to pass therethrough, the second laser beam being the laser beam that has taken a round trip through the discharge region after passing through the first opening; and
a second shielding member facing the first shielding member with the discharge region located therebetween, the second shielding member including a third opening through which the first laser beam that has been propagated through the first opening and the discharge region and the second laser beam that is to be propagated to the second opening through the discharge region pass, wherein
a plane shape of the third opening includes a rectilinear segment,
when a plane shape of the third opening is projected onto the first shielding member, a line segment interconnecting a centroid of a plane shape of the second opening and a centroid of a plane shape of the third opening is directed differently from a line perpendicular to the rectilinear segment, and when diffracted light is caused by passage of spontaneous emission light through the third opening, intensity of the diffracted light is reduced in a direction of the line segment relative to the intensity of the diffracted light in a direction of the line perpendicular to the rectilinear segment.

2. The gas laser device according to claim 1, wherein a plane shape of the third opening includes two rectilinear segments that define a corner therebetween, and when a plane shape of the third opening is projected onto the first shielding member, a centroid of a plane shape of the second opening and a centroid of a plane shape of the third opening line up in a direction of a line segment interconnecting a centroid of a plane shape of the third opening and the corner.

3. The gas laser device according to claim 1, wherein a plane shape of the third opening includes two rectilinear segments that define a corner therebetween, and when a plane shape of the third opening is projected onto the first shielding member, an angle θ defined by a line segment interconnecting a centroid of a plane shape of the second opening and a centroid of a plane shape of the third opening and a line segment connected to the corner satisfies the formula:

$n(\pi/2)-0.14\pi \leq \theta \leq n(\pi/2)+0.14\pi$.

4. The gas laser device according to claim 1, wherein a plane shape of the second opening includes a rectilinear segment, the second shielding member includes a fourth opening to allow a third laser beam to pass therethrough, the third laser beam being the laser beam that has been propagated through the second opening and the discharge region, and a fifth opening to allow a fourth laser beam to pass therethrough, the fourth laser beam being the laser beam that has taken a round trip through the discharge region after passing through the fourth opening, and when a plane shape of the second opening is projected onto the second shielding member, a line segment interconnecting a centroid of a plane shape of the second opening and a centroid of a plane shape of the fifth opening is directed differently from a line perpendicular to the rectilinear segment of the second opening.

5. The gas laser device according to claim 1., wherein a plane shape of the third opening is a polygon including one or more pairs of parallel sides.

6. The gas laser device according to claim 1, further comprising a housing to house the discharge electrode, the first shielding member, and the second shielding member, wherein the first laser beam is the laser beam first propagated through the discharge region after entering the housing and passes through the third opening.

7. The gas laser device according to claim 1, further comprising a plurality of mirrors to reflect the laser beam, the plurality of mirrors facing each other with the first shielding member, the discharge region, and the second shielding member disposed therebetween, wherein at least one of the plurality of mirrors is a concave mirror.

* * * * *